United States Patent
Cochran

(10) Patent No.: US 8,059,539 B2
(45) Date of Patent: Nov. 15, 2011

(54) LINK THROUGHPUT ENHANCER

(75) Inventor: Robert A. Cochran, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1731 days.

(21) Appl. No.: 11/027,170

(22) Filed: Dec. 29, 2004

(65) Prior Publication Data

US 2006/0140114 A1    Jun. 29, 2006

(51) Int. Cl.
*G01R 31/08* (2006.01)
(52) U.S. Cl. ........ 370/232; 370/231; 370/235; 709/224; 709/225; 398/27; 398/28; 707/656; 707/659; 707/660; 707/801; 707/812
(58) Field of Classification Search .................. 370/212, 370/395.41, 229–236; 709/223–226; 398/25–38, 398/58–64, 57
See application file for complete search history.

(56) References Cited

U.S. PATENT DOCUMENTS

| | | | |
|---|---|---|---|
| 5,694,428 A * | 12/1997 | Campana, Jr. ................. 375/260 |
| 5,959,750 A * | 9/1999 | Eskildsen et al. ............... 398/92 |
| 6,134,220 A * | 10/2000 | Le Strat et al. ............... 370/252 |
| 6,330,572 B1 | 12/2001 | Sitka |
| 6,539,205 B1 * | 3/2003 | Wan et al. ..................... 370/465 |
| 6,556,965 B1 * | 4/2003 | Borland et al. ............ 704/200.1 |
| 6,570,915 B1 * | 5/2003 | Sweitzer et al. ............... 375/225 |
| 6,584,499 B1 | 6/2003 | Jantz et al. |
| 6,594,745 B2 | 7/2003 | Grover |
| 6,711,612 B1 * | 3/2004 | Blumenau et al. ............ 709/223 |
| 6,779,082 B2 | 8/2004 | Burger et al. |
| 6,785,291 B1 * | 8/2004 | Cao et al. ....................... 370/431 |
| 6,888,793 B1 * | 5/2005 | Orui .............................. 370/229 |
| 6,931,659 B1 * | 8/2005 | Kinemura ..................... 725/111 |
| 7,155,236 B2 * | 12/2006 | Chen et al. .................... 455/454 |
| 7,212,545 B2 * | 5/2007 | Abel et al ...................... 370/468 |
| 7,317,754 B1 * | 1/2008 | Remy et al. ................... 375/222 |
| 7,478,154 B2 * | 1/2009 | Cochran et al. ............... 709/224 |
| 2002/0049778 A1 * | 4/2002 | Bell et al. ...................... 707/200 |
| 2002/0061073 A1 * | 5/2002 | Huang et al. .................. 375/295 |
| 2002/0161907 A1 * | 10/2002 | Moon ............................ 709/230 |
| 2003/0005120 A1 | 1/2003 | Mutallik et al. |
| 2004/0153721 A1 | 8/2004 | Fujimoto |
| 2006/0062028 A1 * | 3/2006 | Powers et al. .............. 363/21.17 |

* cited by examiner

Primary Examiner — Christopher Grey

(57) ABSTRACT

An apparatus and communication method that provide for communicating information on a standardized link compliant with a published standard and communicating information on a private link capable of operation at a throughput higher than maximum throughput of the published standard. The apparatus and method further provide for monitoring private link performance and increasing information throughput on the private link above the maximum standard throughput by an amount determined by the monitored private link performance.

20 Claims, 5 Drawing Sheets

LINK THROUGHPUT ENHANCER

BACKGROUND

Performance improvements in computing and storage, along with a drive to exploit these improvements in highly challenging applications, have increased the demand for extremely fast data links, for example in areas of high-speed and data-intensive networking. One example of a highly challenging application is data replication in information storage and retrieval. For systems that are expected to operate continuously, a duplicate and fully operational backup capability is implemented in the event a primary system fails.

Data replication, which may also be called mirroring, is a process that generates a mirrored copy of information on two or more storage devices, a primary volume and one or more secondary volumes. The goal is availability of important information on duplicate storage devices at all times. The duplicates may reside on the same or different devices or systems. Similarly, the duplicates may reside on local or remote devices or systems. The obvious advantage of remote replication is avoidance of destruction of both the primary and secondary copies in the event of a disaster occurring in one location.

Corporations, institutions, and agencies sharing common databases and storage systems often include enterprise units that are widely dispersed geographically and therefore may use data replication over very large distances. Distance between storage sites increases communication latency, and reduces speed and reliability, although the demand for fast communication remains.

In response to the demand for fast data links, various network interconnect standards have been developed to enable faster communication between computers and input/output devices. One example of an interconnect standard is a Fibre Channel (FC) standard and associated variants, which are defined in an effort to facilitate data communication, including network and channel communication, between and among multiple processors and peripheral devices. The Fibre Channel standard enables transfers of large information amounts at very high rates of two or more gigabits (Gb) per second.

Remote replication links in storage systems tend to be exclusively standard links with a specified standard throughput, for example 1-2 Gb for the Fibre Channel standard. Replication links may be implemented on other standards, such as Enterprise Systems Connection (ESCON), Small Computer Systems Interface (SCSI), and others.

SUMMARY

A communication method comprises communicating information on a standardized link compliant with a published standard and communicating information on a private link capable of operation at a throughput higher than maximum throughput of the published standard. The method further comprises monitoring private link performance and increasing information throughput on the private link above the maximum standard throughput by an amount determined by the monitored private link performance.

BRIEF DESCRIPTION OF THE DRAWINGS

Embodiments of the invention relating to both structure and method of operation, may best be understood by referring to the following description and accompanying drawings.

DETAILED DESCRIPTION

For a network or interconnect system or for a geographically dispersed storage or database system that implements industry standard components, devices, and other infrastructure elements, communication rates are limited to the throughput specified by the standard. In various applications, configurations, and conditions, the communication links connecting particular networked devices may have a length much less than the maximum length defined by the standard. Similarly, the communication links may have a signal quality much higher than the minimum specified for the standard.

An interconnect structure or network may include one or more nonstandard links and exploit the nonstandard character of the link by disregarding constraints to operate according to industry standard throughput rates, although the communication may follow protocols similar or identical to industry standard protocols. By disregarding the data rate constraints, an illustrative system can substantially increase throughput. In various embodiments, the nonstandard links may be private links, dark fiber links, dark fiber point-to-point links, or other links.

Standards are set according to attainable technological capabilities in typical operating conditions and configurations. Standards for communication links are accordingly set to handle communications between sites separated by hundreds of miles with limited signal quality. The disclosed structures and communication techniques acknowledge that many, in fact most, communication links are substantially shorter and have substantially higher signal quality than the "least common denominator" to which the standards are set. The disclosed structures and communications techniques exploit the expected more favorable communication conditions, when appropriate, to enhance throughput. Accordingly, the disclosed structures and communication techniques generally produce a significant throughput improvement. In many embodiments, the disclosed structures and communication techniques include support for the standard techniques so that throughput in the system disclosed herein is at least as good as the standard implementation.

Figure 1:
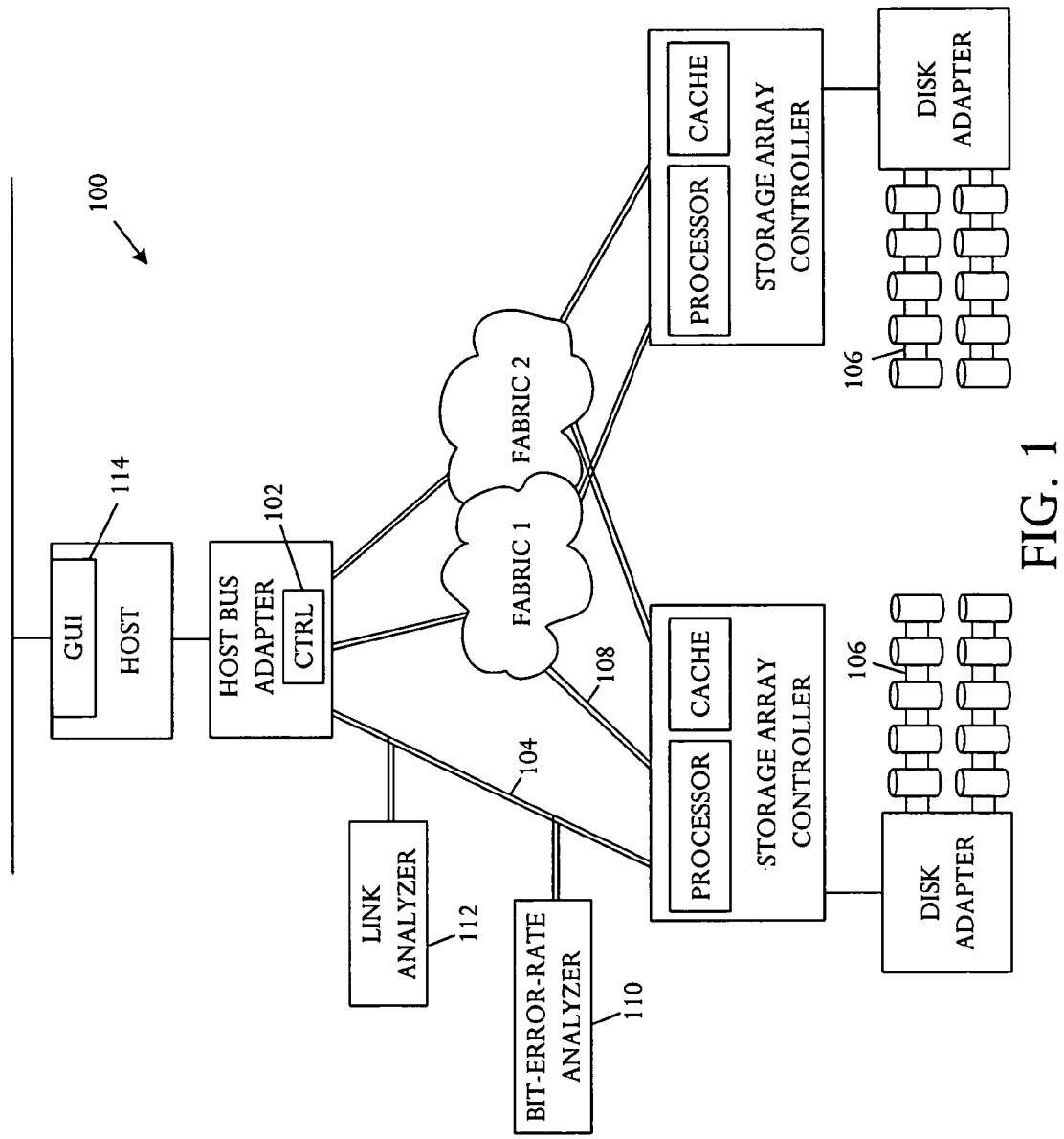
FIG. 1 is a schematic block diagram illustrating an embodiment of a storage apparatus configured to perform private link throughput enhancement.

Referring to FIG. 1, a schematic block diagram illustrates an embodiment of a storage apparatus 100 configured to perform private link throughput enhancement. The apparatus 100 comprises a communication controller 102 adapted to communicate information on a standardized link 108 that is compliant with a published standard, and on a private link 104 capable of operation at a throughput higher than maximum throughput of the published standard. The communication controller 102 can monitor private link performance and selectively increase information throughput on the private link 104 above the maximum standard throughput based on link performance.

A private link 104 is defined herein as a communication link that is exclusive of industry standard links that operate at an industry standard throughput rate. A common example of an industry standard communication link is the Fibre Channel standard. In some embodiments, the private link 104 may be further defined as a point-to-point communication link between network devices, such as storage arrays 106. In various embodiments, a private link 104 may be further defined as a communication link that does not have one terminus directly attached to a public, shared network which supports a standard managed network. Although a signal may transit a private link and ultimately reach a standard network link, the private link retains character as a private link. In some embodiments, private links 104 may be constructed with dedicated leased lines, dial-up lines, satellite links, microwave links, or the like. The private links 104 may connect local sites or remote sites. Private links 104 are typically considered private on the basis that no other traffic than traffic of the entity leasing or controlling the private links communicates on the links.

Private networks have traditionally been built with dedicated leased lines, dial-up lines, or other links such as satellite or microwave. Links are established among remote sites. The links are "private" because no other traffic except the traffic of the company leasing the links crosses the links In a typical embodiment, the communication controller 102 is adapted to reside within storage arrays and communicate information on a point-to-point remote replication link 108 interconnecting one or more storage arrays 106. In some embodiments, the communication controller 102 manages information communication information on a private dark fiber point-to-point link connecting remotely replicated storage arrays 106. In some embodiments, a point-to-point link may use a specially-modified Dense Wavelength Division Multiplexing (DWDM) extender which has a capability to adjust to varying bit times.

Dark fiber is defined as an optical fiber infrastructure, including cables and repeaters that are currently installed and existing, but is not currently used in a public network. A sometimes substantial amount of dark fiber-optic cable may exist because the cost of installing cable in excess of expected short-term capacity is small in comparison to installing more cable at a later time. The dark fiber may be leased for usage by individuals or small operations and thus may be neither controlled nor connected to a public utility. Accordingly, the small operation or even an individual may supply components sufficient to make the dark fiber operational. The dark fiber may further be used to interconnect relatively local components of a storage system.

In various embodiments, the storage apparatus 100 is an adapter, device, component, or the like that facilitates and enhances communication. Common examples of the storage apparatus 100 are Network Interface Cards (NICs), Transmission Control Protocol/Internet Protocol (TCP-IP) NICs, Host Bus Adapters (HBAs), Storage Area Network (SAN) HBAs, network management appliances, intelligent switches, or any similar functional element. The storage apparatus 100 is commonly used to offload input/output operations from a computing element such as a host computer so that data transfer rates increase. Although TCP-IP Network Interface Cards (NICs) and SAN Host Bus Adapters (HBAs) vary greatly in the amount of attainable host offloading, a generally common characteristic of standard input/output interfaces, regardless of communication protocol, is that a maximum theoretical distance, and corresponding minimum per-bit clock rate, is de-rated by as much as 20-100% to account for wide variability in link type, link quality, fiber bend radius, cross-talk, and poor mechanical connections.

The effect of the lowering the rated optical transmission capability due to such deterioration or insufficiency is that the published interface standard is highly compromised to account for compatibility under worst case or least common denominator conditions. For example, the interface standard of 2 gigabits (Gb) per second for Fibre Channel may, under best-case conditions, easily enable a throughput of two to ten times the bit rate of the published specification.

Under industry standard constraints, a private link, without intermediate commercial repeaters or switches, is commonly used as the weakest link in what may be a multiple million dollar enterprise data replication scheme. The cost of leased dark fibers over time may overwhelm the original hardware cost. Accordingly, the illustrative apparatus 100 and associated operating method may enable a tremendous competitive advantage, possibly a cost advantage in the range of millions of dollars, over several years.

In some embodiments, the communication controller 102 may be adapted to communicate information on the private link 104 using a communication technique selected from among multiple communication techniques that are implemented and operable on the private link 104. In a typical embodiment, the communication controller 102 supports communication techniques operable on the private link 104 including an industry standard communications technique and an increased throughput communications technique.

In a particular embodiment, the apparatus 100 may further comprise a bit error rate analyzer 110 coupled to the communication controller 102. The communication controller 102 can selectively communicate information on the private link 104 using a communication technique that increases throughput rate while balancing bit rate and bit error rate.

In some embodiments, the communication controller 102 is adapted to communicate information on the private link 104 using a digital pulse width modulation communication technique that encodes information as an increment in pulse width over a nominal pulse width.

Other embodiments may combine multiple techniques, for example using both the bit rate analyzer 110 and digital pulse width modulation. Accordingly, throughput is increased by selectively communicating information on the private link 104 by balancing bit rate and bit error rate, and throughput is further enhanced by the digital pulse width modulation technique.

The particular communication technique that executes at a particular time can be determined using various techniques. In some conditions, implementations, and/or embodiments, the apparatus 100 includes a link analyzer 112 that is connected to the private link 104 and operates in conjunction with the communication controller 102. The link analyzer 112 determines a condition of communications on the private link 104. The communication controller 102 selects from among the multiple communication techniques based on the communications condition.

In some conditions, implementations, and/or embodiments, the apparatus 100 further comprises a graphical user interface 114 that interacts with the communication controller 102 and is operated by a user to select from among the multiple communication techniques.

Figure 2:
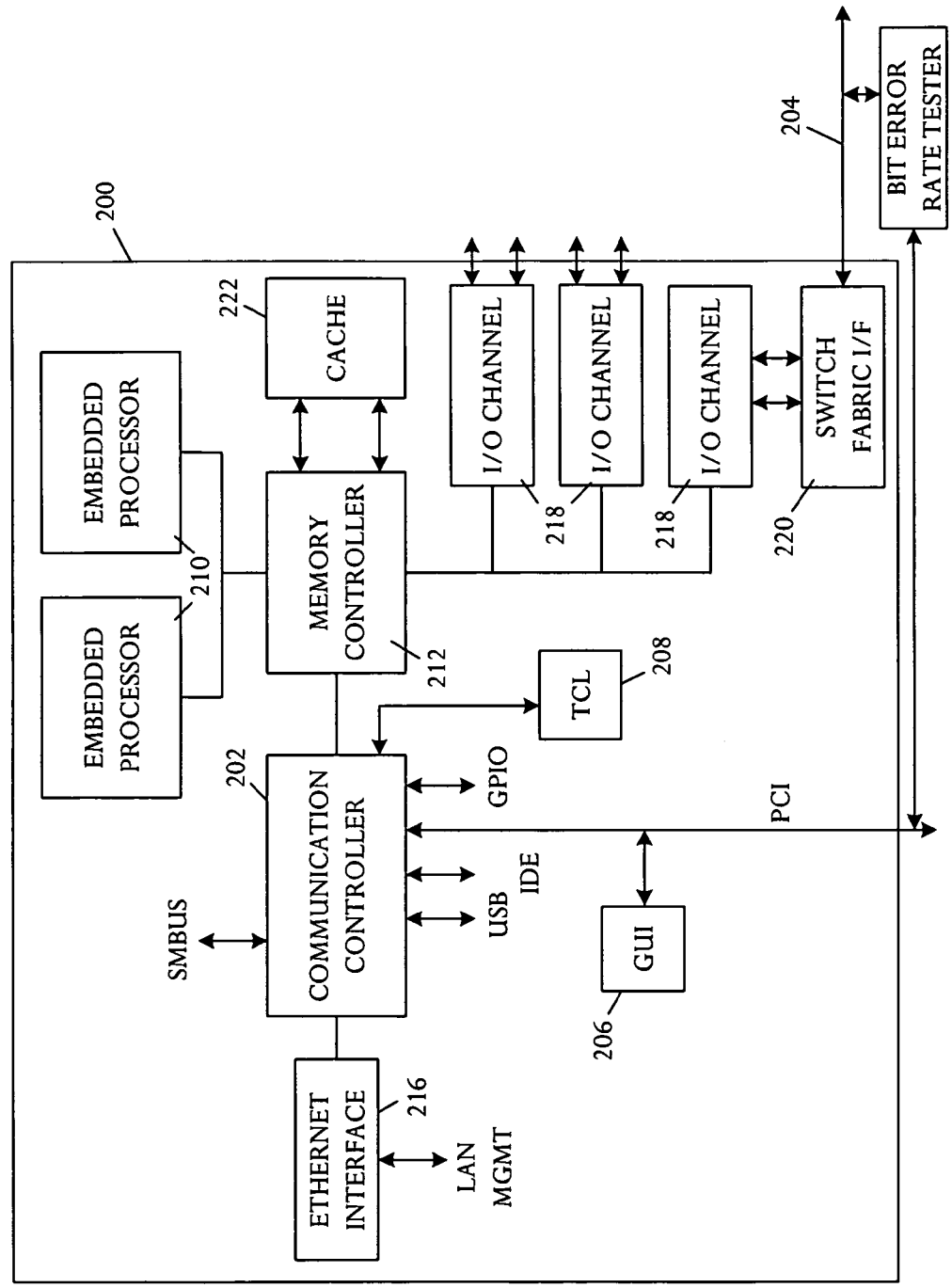
FIG. 2 is a schematic block diagram depicting an embodiment of a storage apparatus that implements a multiple-tiered technique to increase communication link throughput.

Referring to FIG. 2, a schematic block diagram depicts an embodiment of a storage apparatus 200 that implements a multiple-tiered technique to increase communication link throughput. The storage apparatus 200 may be implemented in any suitable electronic system, device, or component such as, for example, a host bus adapter, a storage controller, a disk controller, a network management appliance, or others. The storage apparatus 200 comprises a communication controller 202 that communicates information on a communication link 204 using a communication technique selected from among multiple-tiered, progressively higher throughput communication techniques. The communication controller 202 monitors error rate on the communication link 204 and selects the communication technique and information throughput based on the monitored error rate.

In various embodiments and/or in particular conditions, the selection may be made either under external control or automatically. For example in some embodiments, a graphical user interface (GUI) may be implemented to enable selection of an operational communication technique from among the techniques of the multiple implemented tiers. In some embodiments, the communication technique may be automatically determined according to results of information sensed as the link communicates information. Some embodiments may include both the GUI support and sensors that enable automatic communication technique selection.

In a particular embodiment, a Tier-0 technique may enable usage of the standard interface, for example a Fibre Channel interface, without alteration. The communication controller 202, based on selection of a communication technique, activates the communication technique selected from among the industry standard communications technique and one of the increased-throughput communication techniques.

In an example configuration, the Tier-0 technique may activate an industry-standard host bus adapter (HBA) and possibly industry-standard switches and/or repeaters without modification so that the bit rate native to the industry-standard components is implemented without rate modification. The apparatus 200 includes a graphical user interface (GUI) 206 and a throughput control logic 208, for example residing on a throughput control-enabled host bus adapter 200. During high-throughput operation with non-standard usage of the protocol's bit rate active, for example with either Tier-1, Tier-2, or Tier-3 operating, a user may revert back to Tier-0 operation, thereby changing communication bit rate to the standard rate.

An embodiment may implement Tier-1 as a logic that enables a decrease in 1/0 signal bit time by increasing the bit clock rate, for example by an increase of one to ten times the standard bit clock rate, for links which are shorter and/or having higher signal quality than a worst case condition.

Some implementations may configure Tier-2 to include a suitable type of signal data compaction. A typical throughput increase resulting from Tier-2 operation may be in a range of four, eight, sixteen or more times normal throughput in an illustrative example whereby the communication controller 202 uses digital pulse width modulation to encode information as an increment in pulse width over a nominal pulse width. Digital pulse width modulation can be implemented in a manner that stretches the bit time and interprets the increase in width as information content of four bits (a nibble), a byte (eight bits), a word (sixteen bits), or more.

In a general digital pulse width modulation application, a pulse with a defined nominal pulse width is extended an interval based on a digital value to be communicated. The number of secondary clock cycles that the extended pulse width exceeds the nominal pulse width is counted. The count corresponds to the digital value. Various embodiments use a counter to determine the extent that the modulated pulse width exceeds the nominal pulse width.

Pulse width encodes the digital value communicated and counters are used to extract the digital data. The digital pulse width modulator does not use a carrier but instead uses synchronized transmitter and receiver clocks running at substantially the same frequency so that the amount of time the modulated pulse is extended is measurable. The digital pulse width modulator performs data compaction by representing either a greater number of bits in the same time frame or the same number of bits in a smaller reference frame.

The illustrative storage apparatus 200 is depicted in the form of a storage controller or possibly a host bus adapter, The apparatus may include a plurality of embedded processors 210 generally are high-performance processors that are capable of transferring information at a high rate to support multiple storage devices in a scaleable storage array controller. A memory controller 212 may be connected to the embedded processors 210 and operates as a hub device to transfer data point-to-point or, in some embodiments on a network fabric, among the multiple storage levels. The illustrative memory controller 212 has multiple channels for communicating with a cache memory 222 to ensure sufficient bandwidth for data caching and program execution. The memory controller 212 has sufficient performance to manage the multiple I/O channels 218.

An Ethernet interface 216 communicates with the memory controller 212 via the communication controller 202 which may be an input/output (I/O) controller hub that includes an integrated Fast Ethernet Media Access Controller (MAC) to form a local area network (LAN) management interface port. The I/O controller hub 214 includes typical peripheral interfaces including Universal Serial Bus (USB), Peripheral Component Interconnect (PCI), Integrated Drive Electronics (IDE), General Purpose Input/Output (GPIO), System Management Bus (SMBus), and the like.

The link 204 may connect to a switch fabric interconnect device 220 and a controller such as a Gigabit Ethernet or Fibre Channel controller based upon the type of network fabric, iSCSI or Fibre Channel.

Figure 3A:
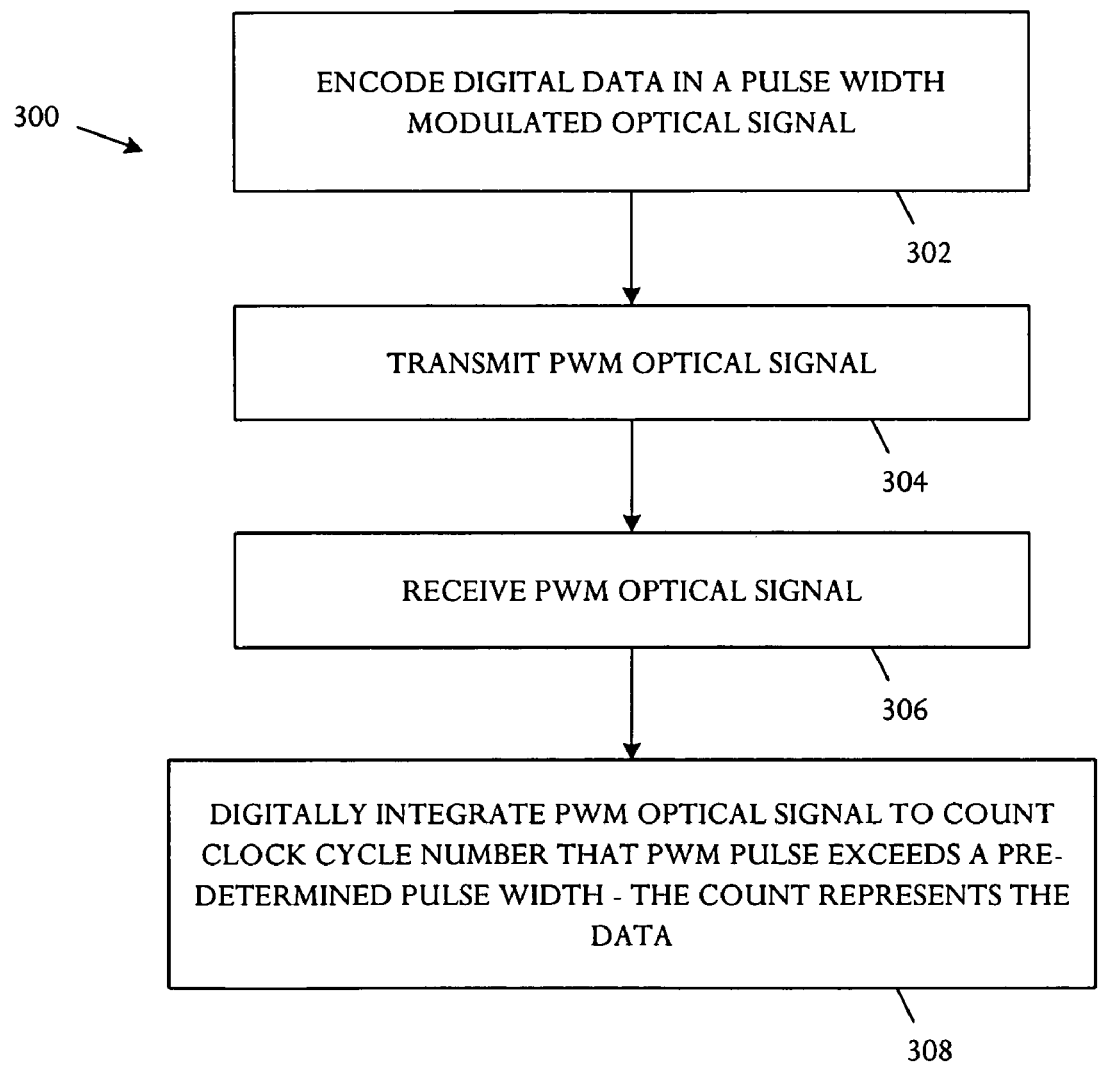
FIG. 3A is a flow chart showing an embodiment of a method of compacting data for serial transmission in an optical network.

Referring to FIG. 3A, a flow chart depicts an embodiment of a method of compacting data 300 for serial transmission in an optical network. In action 302, digital data is encoded in a pulse width modulated optical signal. The pulse width modulation optical signal is transmitted in action 304. On the receiver side, the pulse width modulator optical signal is detected in action 306. The number of clock cycles that the digital pulse width modulator pulse exceeds a nominal pulse width is counted in action 308. The count corresponds to the length of a pulse and the value of the digital data communicated.

Figure 3B:
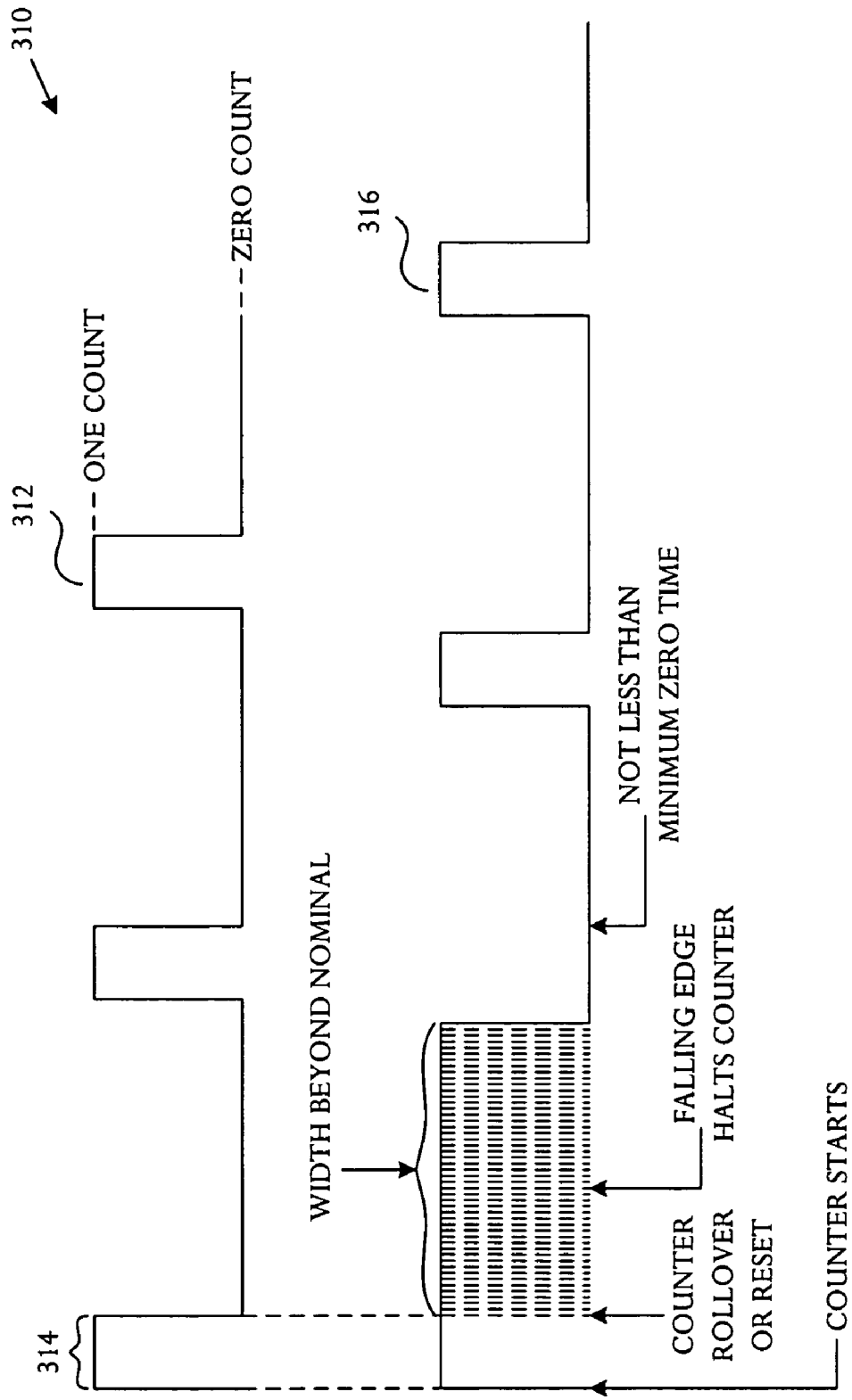
FIG. 3B is a time graph illustrating operation of the embodiment of the data compaction method.

Referring to FIG. 3B, a time graph 310 illustrates the operation of the embodiment of the data compaction method. The time graph 310 shows encoding of digital data through modulation of pulse width. An unmodulated pulse train waveform 312 has two states, "one" or "zero". Each "one" is indicated by a pulse of nominal width 314. The duration of the pulse is termed "one time" or "one count". Time duration between the pulses is called "zero time" or "zero count".

Digital data is communicated by modulating the pulse train waveform 312 to produce a pulse width modulated waveform 316. The modulation effectively shifts the falling edge of the modulated pulse.

In one embodiment, the nominal pulse width is only increased, not decreased, to encode the digital information. The pulse width is increased only in discrete amounts such that the pulse falling edge may occur at n possible locations including the position of the falling edge of the nominal pulse.

In one embodiment, the maximum modulated pulse width is twice the nominal pulse width.

The pulse rising edge indicates transmission of a new digital data value. The pulse falling edge indicates the end of transmission of the digital data value and is determinative of the value. The data value may be recovered by determining the amount the modulated pulse width exceeds the nominal pulse width. In one embodiment, a demodulation counter determines the data value. The counter effectively functions as a digital integrator but is unaffected by amplitude, phase, or frequency of the modulated signal, other than triggering thresholds that start and stop the counter. The digital value is indicated only by the change in nominal width, rather than the total pulse width. Therefore the counter is to account for the nominal pulse width. One embodiment accounts for the nominal pulse width by integrating or counting throughout the entire pulse width and subtracting the nominal pulse width count. Another embodiment resets the counter or configures the counter to rollover at the count associated with the nominal pulse width count.

A Tier-3 implementation may combine Tier-1 and Tier-2 concurrently to attain a shared effect in the illustrative example of four to eighty times the standard throughput. Tier-3 is typically effective for links that are much shorter and/or having much higher signal quality than the limits imposed by the standard. Typically, conditions enabling Tier-3 operation are attainable for links that are confined to a single electronics system rack or to a single data center. The Graphical User Interface (GUI) 206 may be used to activate Tier-3 operation based, for example, on knowledge of link length and conditions. The GUI 206 may also access and display information from an attached bit rate tester or other link analyzer to enable the user to determine whether Tier-3 operation is appropriate.

In some embodiments, Tier-3 may include dynamically-selected compaction whereby the increase in throughput rate of Tier-2 data compaction is selected according to line quality, as determined by the bit-error-rate measured in Tier-1 operation.

Figure 4:
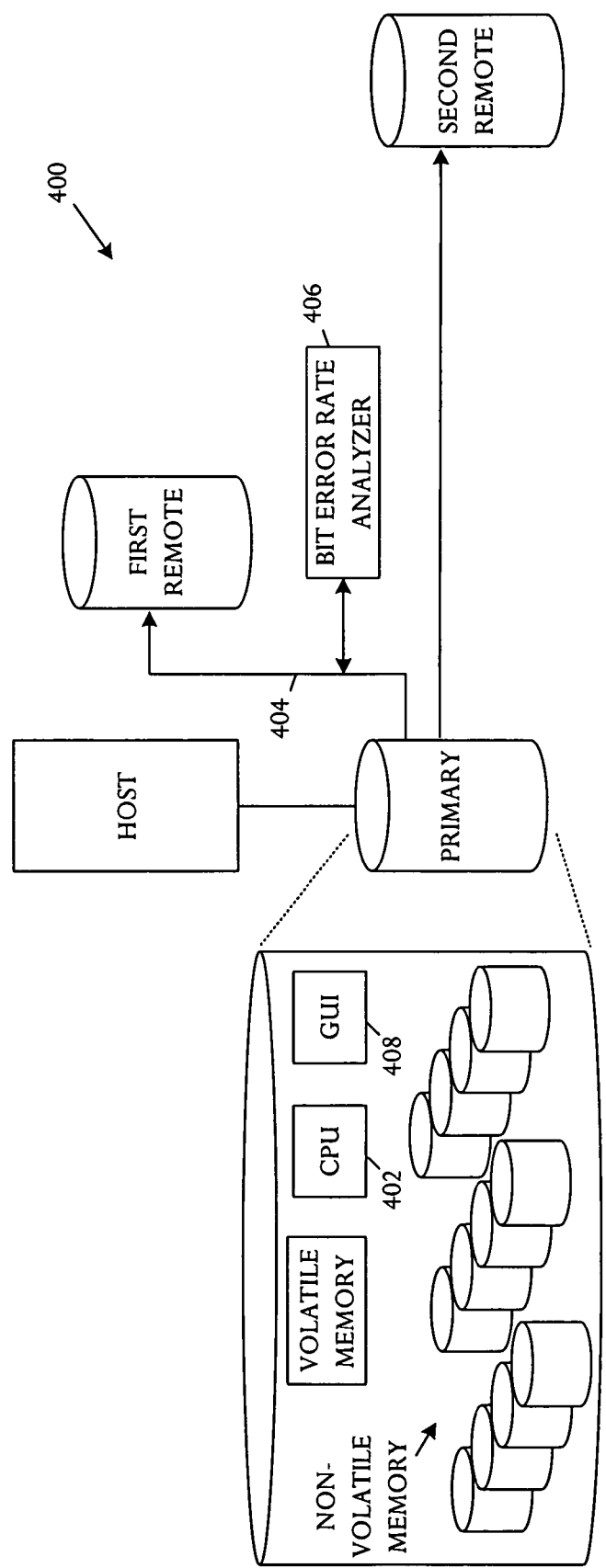
FIG. 4 is a schematic block diagram illustrating an embodiment of a storage apparatus that implements a technique using bit error rate measurements for enhancing throughput on a communication link.

Referring to FIG. 4, a schematic block diagram illustrates an embodiment of a storage apparatus 400 that implements a technique using bit error rate measurements for enhancing throughput on a communication link 404. The storage apparatus 400 comprises a bit-error-rate analyzer 406 and a communication controller 402 that function in combination to communicate information on the communication link 404 using a communication technique that selectively increases clock rate throughput and mutually optimizes bit rate and bit error rate, increasing throughput rate while balancing bit rate and bit error rate.

The communication controller 402 may increase the bit rate, for example in a range from one to ten times the standard rate, for a communication link that is somewhat shorter and higher quality than the worst case link under the industry standard. An example of a higher quality communication link may be a combined optical/copper cable with a relatively small number of mechanical connectors or an optical cable with small radius bends, or a copper cable.

In an implementation example, a graphical user interface (GUI) 408 on a host computer may be operational, following connection of host bus adapters and communication links in operational positions, in a link throughput test mode. The GUI 408 may include a slider bar which enables optimization of either bit-rate or bit-error-rate in two different operating modes.

In a first mode, a user can select a GUI setting to enable a free-floating bit-error-rate and a fixed bit-rate. The user sets the slider bar to an arbitrary bit-rate setting within an allowable throughput enhancement range. A typical enhancement range may be one to ten times the standard throughput, although any suitable enhancement may be implemented. The bit-error-rate analyzer 406 continuously runs and reports a real-time bit-error-rate. For example, a sample test pattern may be transmitted back and forth across the link or links in a bi-directional manner while the bit-error-rate is calculated in real-time. The slider bar may be left at a maximum bit rate at which an acceptable bit-rate-error can be empirically attained. For example, one bit error in $10^{10}$ bits may be defined as a low standard. One bit error in $10^{15}$ bits may be specified as an average standard. One bit error in $10^{17}$ bits may be assigned to a high standard. The time to send such a large number of test bits over a link is too lengthy to be feasible. A more realistic and typical empirical approach is to continually reduce the bit time until a first error occurs, then reduce the bit-rate by a de-rating factor of 10-30%.

In a second mode, the user may select a GUI setting to enable a free-floating bit-rate and a fixed bit-error-rate. Based on the specified maximum bit-error-rate, the real-time bit-error-rate analyzer 406 detects the error-rate and the bit-rate is automatically and continuously adjusted, incremented to decremented, to hold the bit-error-rate at the specified maximum bit-error-rate. The user may select the maximum bit-error-rate from a menu of typical values in a range from ideal to poor.

In some implementations or embodiments, the fixed bit-error-rate may be dynamically determined, for example in response to demand, so that higher error rates may be tolerated if the demand is uniquely met by other aspects of the system. For example, a system may have additional error detection capability to reduce or minimize the number of undetected errors. Internet Small Computer Systems Interface (iSCSI) has a suitable error detection capability. Demand may be determined by sensing of various conditions such as throughput, queuing, and the like.

During typical operation, once a user makes selections via the GUI 408, and selects possible de-rating factors such as 10%, 20%, or the like, the throughput control maintains a substantially steady-state with no change to initialized parameters unless a physical change affects the link, such as a degraded or broken physical connection, a cable bend radius is altered, or the like. In the event the standard protocol, for example Fibre Channel protocol, encounters error and re-tries, the throughput enhancement controller-enabled devices, for example host bus adapter, may be enabled to make automatic adjustments until the re-tries no longer occur.

A typical apparatus implementation may include the bit-error-rate analyzer 406 and other link analysis capabilities, for example by generating continuous data or control characters on a transmit path and expect continuous data or control characters on the receive path. Monitoring and analysis of the received data enables link fault detection and generation of signals indicating reliability of the link. The apparatus 400 may implement test pattern generation and checking for link testing and system testing. The bit-error-rate analyzer 406 typically performs monitoring and generates an error rate indication to enable constant line quality monitoring.

In a typical embodiment, the bit-error-rate analyzer 406 is transparent to the link and generates bit error rate patterns using American National Standards Institute (ANSI) standards. The patterns are framed using suitable framing protocols so that the link is tested with actual data traffic at actual operating speeds of the data link. Bit errors are counted and used to supply a statistical measurement of data link quality.

In a particular implementation, a pair of Fibre Channel interface cards may be equipped with throughput enhancement devices and used to facilitate communications within a single electronics rack, for example with an approximately one meter cable, to operate at a data rate of four to eighty times the standard 1-2 Gb throughput rate. A similar connection within a single data center, for example with an approximately ten meter cable, may operate at a data rate of four to ten times throughput improvement. Even a link with a multiple-kilometer length dark fiber, for example a premium optical fiber in a private trench, may realize a two times or more improvement in industry-standard throughput.

Throughput of long distance replication links is generally the single most limiting factor—the weakest link—in a multiple million dollar data replication arrangement. Accordingly, implementation of the illustrative throughput enhancement may dramatically improve the total number of links implemented in a system, the initial copy times for data volumes, and the maximum traffic per link. A reduction in the total number of implemented links may save substantial expense which, over time, may eclipse the cost of the storage arrays in the replication system.

For short-distance links, threshold enhancement-equipped Fiber Channel interface cards may be used as an alternative to infini-band and other high bandwidth link types.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the disclosed apparatus and technique can be used in any storage and communication configuration with any appropriate number of storage arrays or elements. The various communication controller, analyzer, and bit test elements may be implemented in any suitable component or device, for example host computers, host bus adapters, storage controllers, disk controllers, management appliances, and the like. The links may be in any configuration and have lengths of any suitable distance. Although, the illustrative system discloses magnetic disk storage elements, any appropriate type of storage technology may be implemented. Control elements may be implemented as software or firmware on general purpose computer systems, workstations, servers, and the like, but may be otherwise implemented on special-purpose devices and embedded systems.

What is claimed is:

1. A data-replication storage system that minors information on two or more storage devices, the system comprising:
a storage array; and
a communication controller that is part of an electronic device and that communicates information to be stored in the storage array, on an industry standard link which is compliant with a published standard and on a private link comprising a fiber link operated in deviation from the published standard at a throughput higher than maximum throughput of the published standard, the communication controller monitors private link performance and selectively increases information throughput on the private link above the maximum standard throughput by an amount determined by the monitored private link performance.

2. The system according to claim 1 further comprising:
the communication controller that communicates information on the private link using a communication technique selected from among multiple-tiered, progressively higher throughput communication techniques operable on the private link, and wherein the electronic device comprises a host bus adapter in the data-replication storage system; and
a graphical user interface coupled to the communication controller that enables a user to select from among the plurality of communication techniques.

3. The system according to claim 1 further comprising:
a bit error rate analyzer coupled to the communication controller, wherein
the communication controller communicates information on the private link using a communication technique that selectively increases clock rate throughput rate and mutually optimizes bit rate and bit error rate, and wherein the electronic device is disposed in the data-replication storage system.

4. The system according to claim 1 further comprising:
the communication controller that communicates information on the private link using a digital pulse width modulation communication technique that encodes information as an increment in pulse width over a nominal pulse width.

5. The system according to claim 1 further comprising:
a bit error rate analyzer coupled to the communication controller, wherein
the communication controller communicates information on the private link using a communication technique that selectively increases clock rate throughput rate and mutually optimizes bit rate and bit error rate and encodes information as an increment in pulse width over a nominal pulse width in a digital pulse width modulation communication technique.

6. The system according to claim 1 further comprising:
a bit error rate analyzer coupled to the communication controller, wherein
the communication controller communicates information on the private link using a communication technique that selectively increases clock rate throughput rate and mutually optimizes bit rate and bit error rate, encodes information as an increment in pulse width over a nominal pulse width in a digital pulse width modulation communication technique, and selects a signal data compaction level based on the bit error rate.

7. A storage apparatus comprising:
a storage array;
a bit error rate analyzer; and
an electronic device comprising a communication controller coupled to the bit error rate analyzer and the storage array, wherein the communication controller communicates information to be stored in the storage array on an industry standard link which is compliant with a published standard and on a private link operated in deviation from the published standard at a throughput higher than maximum throughput of the published standard,. wherein the communication controller monitors private link performance and selectively increases information throughput on the private link above the maximum standard throughput by an amount determined by the monitored private link performance, and communicates information on the private link using a communication technique that selectively increases clock rate throughput rate and mutually optimizes bit rate and bit error rate.

8. The apparatus according to claim 7 further comprising:
a graphical user interface coupled to the communication controller that enables the user to selectively operate the communication controller in a first mode that enables a free-floating bit-error rate, a fixed bit rate, and communication at a highest bit rate at which an acceptable bit-error rate is attained, and to selectively operate in a second mode that enables a free-floating bit rate, a fixed bit-error rate, and communication that adjusts bit rate to a maximum, and wherein the electronic device comprising the communication controller is a component of a geographically-dispersed data storage system.

9. The apparatus according to claim 7 wherein:
the communication controller communicates information using a communication technique that selectively increases clock rate throughput rate and mutually optimizes bit rate and bit error rate and encodes information as an increment in pulse width over a nominal pulse width in a digital pulse width modulation communication technique.

10. The apparatus according to claim 7 wherein:
the communication controller communicates information on the private link using a communication technique that selectively increases clock rate throughput rate and mutually optimizes bit rate and bit error rate, encodes information as an increment in pulse width over a nominal pulse width in a digital pulse width modulation communication technique, and selects a signal data compaction level based on the bit error rate.

11. A communication method of increasing throughput in a data storage system, the method comprising:
communicating, via an electronic device comprising a communication controller in the data storage system, information to be stored in a storage array on an industry standard link which is compliant with a published standard;
communicating, via the communication controller, information to be stored in the storage array on a private link comprising a fiber link operated in deviation from the published standard at a throughput higher than maximum throughput of the published standard;
monitoring private link performance; and
increasing information throughput on the private link above the maximum standard throughput by an amount determined by the monitored private link performance.

12. The method according to claim 11 further comprising:
monitoring bit error rate on the private link;
selectively increasing clock rate throughput rate;
selectively enabling a free-floating bit-error rate, a fixed bit rate, and communication at a highest bit rate at which an acceptable bit-error rate is attained; and
selectively enabling a free-floating bit rate, a fixed bit-error rate, and communication that adjusts bit rate to a maximum.

13. The method according to claim 11 further comprising:
selectively increasing clock rate throughput rate;
mutually optimizing bit rate and bit error rate; and
encoding information as an increment in pulse width over a nominal pulse width in a digital pulse width modulation communication technique.

14. The method according to claim 11 further comprising:
selectively increasing clock rate throughput rate;
mutually optimizing bit rate and bit error rate;
encoding information as an increment in pulse width over a nominal pulse width in a digital pulse width modulation communication technique; and
selecting a signal data compaction level based on the bit error rate.

15. The system according to claim 1, wherein no terminus of the private link is directly attached to a public, shared network that supports a standard managed network, and wherein the private link comprises a communication link that is exclusive of any industry standard links that operate primarily at an industry standard throughput rate.

16. The system according to claim 1, wherein the electronic device has an Ethernet interface and a switch fabric interconnect device.

17. The apparatus according to claim 7, wherein the electronic device comprising the communication controller comprises a host bus adapter, a storage controller, or a disk controller, or any combination thereof.

18. The apparatus according to claim 7, wherein the private link comprises a fiber optic cable and is configured to only communicate information associated with a company leasing or owning the private link.

19. The method according to claim 11, wherein communicating information on the private link comprises only communicating data of a company leasing or owning the private link, and disregarding the data rate constraints of the published standard.

20. The method according to claim 11, wherein communicating information on the private link comprises communicating data to be stored in the storage array from a host via the electronic device comprising a host bus adapter or storage controller, and following on the private link protocols similar or identical to protocols of the published standard associated with the industry standard link.

* * * * *

UNITED STATES PATENT AND TRADEMARK OFFICE
CERTIFICATE OF CORRECTION

| | |
|---|---|
| PATENT NO. | : 8,059,539 B2 |
| APPLICATION NO. | : 11/027170 |
| DATED | : November 15, 2011 |
| INVENTOR(S) | : Robert A. Cochran |

It is certified that error appears in the above-identified patent and that said Letters Patent is hereby corrected as shown below:

In column 9, line 56, in Claim 1, delete "minors" and insert -- mirrors --, therefor.

In column 10, line 61, in Claim 7, delete "standard,." and insert -- standard, --, therefor.

Signed and Sealed this
Twenty-eighth Day of August, 2012

David J. Kappos
*Director of the United States Patent and Trademark Office*